United States Patent [19]

Sato

[11] Patent Number: 5,106,244
[45] Date of Patent: Apr. 21, 1992

[54] AIR OPERATED CHUCK

[75] Inventor: Takao Sato, Nara, Japan

[73] Assignee: Fujii Seimitsu Kogyo Co., Ltd., Nara, Japan

[21] Appl. No.: 602,203

[22] Filed: Oct. 23, 1990

[30] Foreign Application Priority Data

Oct. 26, 1989 [JP] Japan ............... 1-281168

[51] Int. Cl.⁵ ............................................... B23Q 3/12
[52] U.S. Cl. ............................................... 409/225
[58] Field of Search .......... 279/1 D, 1 G, 1 W, 2 A, 279/46, 4, 1 P; 409/233, 231, 219, 225

[56] References Cited

U.S. PATENT DOCUMENTS

| 2,821,400 | 1/1958 | Hohwart et al. | 279/1 D |
| 2,958,532 | 11/1960 | Benjamin et al. | 279/46 X |
| 3,087,737 | 4/1963 | Werth | 279/1 D |
| 3,191,952 | 6/1965 | Morawski | 279/1 D |
| 3,355,182 | 11/1967 | Hohwart et al. | 279/1 D |

FOREIGN PATENT DOCUMENTS

| 186307 | 9/1985 | Japan | 279/1 D |
| 446383 | 4/1975 | U.S.S.R. | 279/1 D |
| 1177072 | 9/1985 | U.S.S.R. | 279/1 D |

Primary Examiner—William Briggs
Attorney, Agent, or Firm—Morrison Law Firm

[57] ABSTRACT

An air operated chuck includes a plurality of hooks arranged in a circle and joined in relative positions by a ring. A membrane holds workpieces of various sizes and shapes on the rotating main shaft of a machine tool with a minimum of vibration or off center mounting for precise machine functions. This is accomplished through the use of interchangeable hook attachments. Each individual hook attachment is adapted to a shape and size range of workpieces. The ring retains the hooks centered about the central axis of the chuck body, thus requiring minimal installation adjustment or balancing. A nonrotating air tube reduces vibration due to an unbalanced air hose.

7 Claims, 1 Drawing Sheet

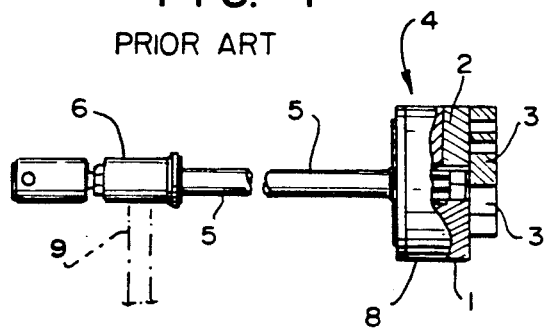
FIG. 1 PRIOR ART
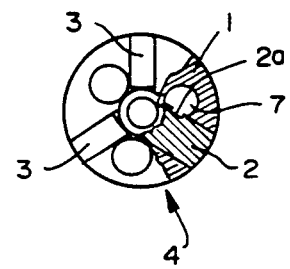
FIG. 2 PRIOR ART
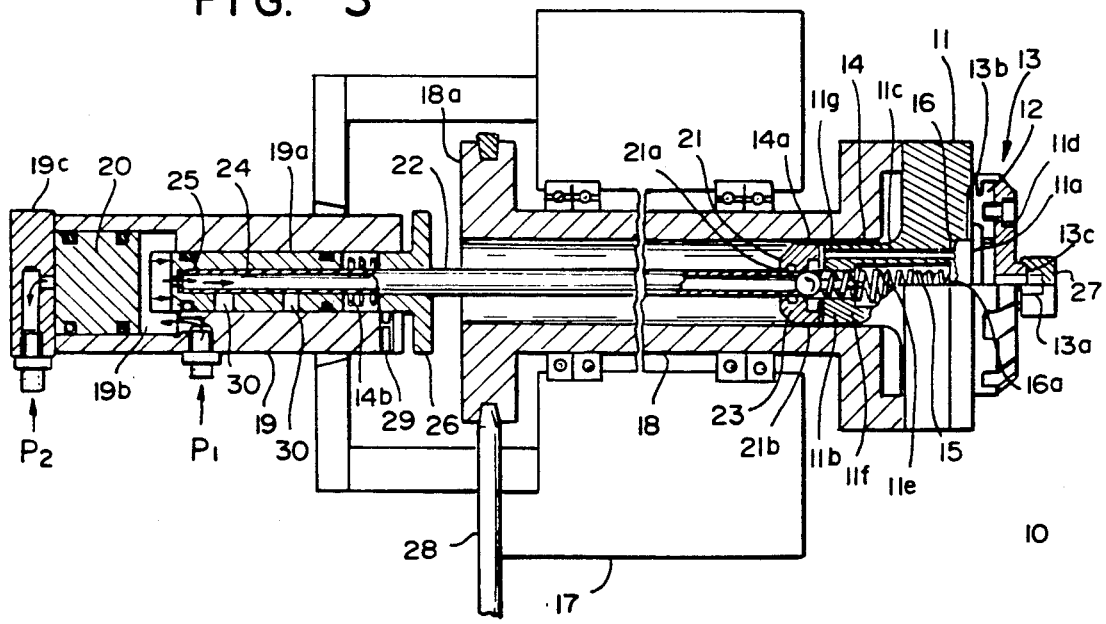
FIG. 3
FIG. 4

AIR OPERATED CHUCK

BACKGROUND OF THE INVENTION

The present invention relates to a workpiece chuck for a machine tool, and more precisely to an air pressure operated workpiece chuck having interchangeable gripping jaws.

The use of air pressure workpiece chucks with machine tools is well known. Such devices employ rotating air lines to carry a constant source of operating air to piston actuated chuck jaw operators. These rotating air lines are difficult to balance and, as a result, transmit vibration to the operating machine tool. In addition, these rotating air lines are subject to friction, causing them to fail during operation.

Interchangeable top chuck jaws are also commonly used with machine tool chucks to adapt them to variety of workpieces. Because these interchangeable jaws are individually mounted, they require special operator skill to assure that they are properly mounted and balanced.

OBJECTS AND SUMMARY OF THE INVENTION

Accordingly, it is an object of the invention to provide an air chuck that overcomes the drawbacks of the prior art.

It is a further object of the invention to provide an air chuck that displays improved reliability and precision operation and that can be operated with a minimum of special skill.

It is a still further object of the invention to provide an air chuck that employs hooks affixed to a deformable membrane. When the membrane is deformed, contacting portions of the hooks move radially.

It is a still further object of the invention to provide an air chuck having a non-rotating air tube axially disposed with respect to the chuck.

It is a still further object of the invention to provide an air chuck having means for maintaining internal air pressure to a chuck-actuation device without requiring a continuous external supply of air pressure.

Briefly stated, the present invention provides an air operated chuck that includes a plurality of hooks arranged in a circle and joined in relative positions by a ring. A membrane holds workpieces of various sizes and shapes on the rotating main shaft of a machine tool with a minimum of vibration or off center mounting for precise machine functions. This is accomplished through the use of interchangeable hook attachments. Each individual hook attachment is adapted to a shape and size range of workpieces. The ring retains the hooks centered about the central axis of the chuck body, thus requiring minimal installation adjustment or balancing. A nonrotating air tube reduces vibration due to an unbalanced air hose.

According to an embodiment of the invention, there is provided a chuck for holding a workpiece comprising: a chuck body, a thin membrane on the chuck body, a rotatable main shaft, the chuck body being axially joined to a first end of the main shaft to be rotated therewith, a means for rotating the main shaft, hooks for gripping the workpiece, the hooks being removably mounted on the thin membrane, the hooks forming a single assembly, means for operating the hooks including: nonrotating means for injecting air into the chuck body for bowing the thin membrane, bowed, the thin membrane opening the hooks, means for retaining the air, the retained air holding the thin membrane bowed, nonrotating means for releasing the air for flattening the thin membrane for closing the hooks, and safety means for releasing excess the air.

According to a feature of the invention, there is provided a chuck for holding a workpiece comprising: a compound cylinder having a first blind bore extending inwardly from a wide first end and a second blind bore extending inwardly from a narrow projection at a second end, the blind bores being axially aligned, the blind bores being separated by a perforated wall, a perforated lid sealing the first blind bore, a thin membrane covering the perforated lid, a piston in the first blind bore, the piston being elastically pressed against the perforated lid, a backflow valve in the second blind bore, a first end of a air tube slidably extending into the second blind bore, the first end of the air tube being open, a second end of the air tube having a perforated wall, the backflow valve elastically closing the first end of the air tube, a narrow air path parallel to the first and second blind bores, a second end of the air tube entering a narrow bore extending some distance from a first end of a cylinder, a second end of the cylinder having a wide bore extending to axially meet the narrow bore, a second end of the cylinder being sealed by an end plate, a free piston 20 movable in two positions in the wide bore, the second end of the air tube elastically held so as to extend slightly into the wide bore, a first air inlet in the cylinder between the free piston and air tube, the air inlet to inlet air to hold the free piston against the end plate, the air inlet to inlet air between the piston in the first blind bore and the thin membrane, the thin membrane expanded outwardly from the first blind bore, the piston in the first blind bore for holding air against the thin membrane, the piston in the first blind bore for releasing excess air, a second air inlet in the cylinder to inlet air between the free piston and the end plate, the free piston to bear against the air tube, and the air tube to urge the backflow valve to open the air path to release the air from between the perforated lid on the first blind bore and the thin membrane.

According to a still further feature of the invention, there is provided a chuck for holding a workpiece, comprising: a thin membrane, the thin membrane having a plurality of gripping members, the gripping members arranged radially around on the thin membrane, the gripping members for supporting a removable hook attachment, the hook attachment including a plurality of hooks arranged radially and joined at the perimeter of the radial arrangement by a ring, the ring supporting the radial arrangement of the hooks, each the hook removably affixed to one of the gripping members, there being one the gripping member for each the hook, and the hooks being movable with the gripping members.

According to a still further feature of the invention, there is provided a chuck comprising: a plurality of hooks, the plurality of hooks each including at least one surface for contacting a workpiece, a membrane, means for affixing the hooks to the membrane, and means for deforming the membrane, whereby the at least one surface on each of the hooks is moved in a radial direction.

The above and other objects, features and advantages of the invention will become apparent from the following description of the preferred embodiment read in conjunction with the accompanying drawings, in which like reference numerals designate the same elements.

BRIEF DESCRIPTION OF THE DRAWINGS

FIG. 1 is a side view of a chuck, partly in cross section, according to the prior art.

FIG. 2 is a front view of the prior art with a partial cutaway showing the relationship of its parts.

FIG. 3 is a cross section of work gripping device according to an embodiment of the invention.

FIG. 4 is a front view of a chuck body of the invention showing a replaceable hook assembly installed and cutaway at the right to show the chuck body.

DETAILED DESCRIPTION OF THE PREFERRED EMBODIMENT

Referring to FIGS. 1 and 2, there is shown an air operated chuck 4 of the prior art. Chuck 4, which is installed in an adapter 8, includes a chuck body 1 on which radially arrayed master jaws 2 are slidably mounted so that they may be slid toward and away from an axial center. A top jaw 3 is removably mounted on each master jaw 2. Removable mounting allows top jaws 3 to be interchanged as required to adapt chuck 4 to a variety of work piece shapes.

An air tube 5 is connected between a rotary journal 6 and chuck 4 to operate a conventional piston (not shown). The piston presses against an actuator 7 that engages master jaws 2 through grooves 2a. An air hose 9 is connected at the inlet of rotary journal 6 to provide the high pressure air that operates chuck 4.

When high pressure air is applied through air hose 9, the air is transmitted through journal 6 to air tube 5. The pressure of the air in air tube 5 moves the piston forward, causing actuator 7 to slide master jaws 2 inward toward the axis of chuck body 1 together with their attached top jaws 3 to grip the work piece to be machined.

In this embodiment of the prior art, while the replaceable top jaws 3 give chuck 4 the ability to accommodate a variety of workpiece sizes and shapes, they are attached individually to each master jaw 2. This is a significant drawback in that the replacement of top jaws 3 requires considerable operator skill to properly balance and center a workpiece for precision machining.

A second major drawback of the prior art, which uses a rotating air tube 5, is that air tube 5 is inherently difficult to balance and can cause chuck 4 to vibrate in adapter 8 further degrading the operation of the machine tool. A rotating air tube 5 is also subject to friction heating, causing air tube 5 to burn into or wear down journal 6 without frequent lubrication.

Referring now to FIG. 3, there is shown, generally at 10, a chuck according to the present invention. A chuck body 11 is a shallow cylinder with a narrow cylindrical protrusion 11b yielding a "T"-shaped cross section. A thin membrane 11a covers a recess 11d at a center of chuck body 11 on the side opposite protrusion 11b. A plurality of gripping members 12 are attached in a radial direction on the surface of thin membrane 11a.

Referring to FIG. 4, a hook attachment 13 is a removable disk that has a circular opening 13a at its center and a ring 13b at its outer perimeter. The body of hook attachment 13 is divided into a plurality of radially oriented hooks 13c that match gripping members 12 in quantity and orientation. The inward pointing edges of hooks 13c are bent vertically to form contact areas for securing a workpiece 27. Hook attachment 13 is removably secured at each hook 13c to a gripping member 12 by a setscrew 29. Hook attachment 13 can be formed for a variety of workpiece 27 shapes and sizes and is interchanged to suit workpiece 27 in process.

Referring again to FIG. 3, an air path 11c enters chuck body 11 at its end surface while an air hole 11g joins a piston bore 11e and a valve spring bore 11f of protrusion 11b. A spring 14 and a pressure maintenance piston 15 are inserted in piston bore 11e. A lid 16 holds piston 15 against spring 14 within piston bore 11e. An air hole 16a in lid 16 releases excess air pressure. Spring 14 and piston 15 ensure that a minimum pressure is maintained as required during operation. The minimum pressure is approximately equal to the force of spring 14 against piston 15.

Protrusion 11b of chuck body 11 is removably inserted into a first end of a tubular main shaft 18, which is rotatably mounted on a machine tool 17. A belt 28 of machine tool 17 is seated in an annular groove that surrounds a pulley end of main shaft 18 to rotate main shaft 18 during operation. A cylinder 19, that is mounted on machine tool 17 a short distance from, and axially aligned with, a pulley end 18a, has a narrow bore 19a extending approximately ⅔ of its length starting at an end proximal to pulley end 18a. Starting at an opposite end of cylinder 19, a wide bore 19b extends to meet narrow bore 19a. A free piston 20 is slidably inserted in cylinder 19b which is closed by an end plate 19c. An air inlet P1 enters wide bore 19b at an end adjacent ot narrow bore 19a, while an air inlet P2 enters cylinder wide bore 19b through end plate 19c.

A spring 14a is inserted into valve spring bore 11f of protrusion 11b to exert pressure against a backflow valve 23 to hold backflow valve 23 against a first end of an air tube 22 that enters valve spring bore 11f through an axial hole 21a in disk shaped guide member 21. Guide member 21 forms a slidable and rotatable airtight seal around air tube 22. Air tube 22 extends back from backflow valve 23 through main shaft 18 and a positioning plug 26 into narrow bore 19a of cylinder 19. An annular recess 21b in guide member 21 allows air to flow around backflow valve 23 when air tube 22 is moved to a forward position. Setscrew 29 holds positioning plug 26 in position at an end of narrow bore 19a. The depth of to which positioning plug 26 penetrates cylinder 19 is adjustable to control the travel of a piston 24 in narrow bore 19a. A second end of air tube 22 is rigidly inserted into narrow bore 19a. Tap screws 30 secure piston 24 to air tube 22.

An air hole 25 at a terminal end of piston 24 allows air flow between wide bore 19b and air tube 22. A spring 14b is positioned between positioning plug 26 and piston 24 to apply back pressure against piston 24.

During operation, a hollow workpiece 27 may be held by chuck 10 from the inside, while a solid workpiece 27 may be held by chuck 10 by its outer surface.

When workpiece 27 is to be held from the inside, it is positioned over hooks 13c. High pressure air is applied through air inlet P1. The high pressure air pushes free piston 20 back toward end plate 19c and flows through piston 24 and air tube 22 causing backflow valve 23 to open. Spring 14b prevents piston 24 from moving forward while air flows around backflow valve 23 through recess 21b in guide member 21 and through air path 11c applying pressure to thin membrane 11a. Thin membrane 11a bows outward under the air pressure, spreading hook attachment 13. This causes hook attachments 13c to grip workpiece 27.

Once workpice 27 is gripped, the air supply is shut off. Spring 14a closes backflow valve 23. Pressure maintenance piston 15, which is a safety release for excess air pressure, is held tightly against lid 16 by spring 14, thus maintaining the air pressure against thin membrane 11a while workpiece 27 is processed with only a slight pressure leak possible.

Because ring 13b assures that all hooks 13c move the same distance as they grip workpiece 27, proper centering of workpiece 27 is assured. In addition, all hooks 13c are joined by ring 13b to form single replaceable hook attachment 13, thereby simplifying replacement and dynamic balancing of hooks 13c.

Because air tube 22 is rotatably supported by guide member 21 and does not rotate with chuck body 11, balancing of air tube 22 is not necessary and the problem of introducing vibration and imbalance through a rotating air tube is eliminated.

To release a workpiece 27 from chuck 10, high pressure air is inlet through air inlet P2, pushing free piston 20 against piston 24. As free piston 20 bears against piston 24, piston 24 causes air tube 22 to open backflow valve 23 allowing the air pressure against thin membrane 11a to escape through air path 11c and recess 21b. With the reduction of air pressure, thin membrane 11a returns to its flattened starting shape, pulling hooks 13c together, releasing workpiece 27.

When a workpiece 27 is to be held by its outer surface, high pressure air is initially applied through air inlet P1 and hooks 13c are spread as if it were to hold a workpiece 27 from the inside. A workpiece 27 is then inserted between the spread hooks 13c. When workpiece 27 is positioned between hooks 13c, air pressure is applied through air inlet P2. The air applied through air inlet P2 presses against free piston 20, which, in turn, pushes piston 24 with air tube 22 against backflow valve 23, thus causing backflow valve 23 to open. As the air pressure is discharged through the path previously described for releasing a workpiece 27 held from the inside, hooks 13c close on workpiece 27 gripping it from the outside.

To release workpiece 27 held by its outer surface, high pressure air is applied through air inlet P1 and hooks 13c are spread as described above.

Having described the preferred embodiment of the invention with reference to the accompanying drawings, it is to be understood that the invention is not limited to those precise embodiments, and that various changes and modifications may be affected therein by one skilled in the art without departing from the scope or spirit of the invention as defined in the appended claims.

I claim:
1. A chuck for holding a workpiece comprising:
 a chuck body;
 a thin membrane on said chuck body;
 a rotatable main shaft;
 said chuck body being axially joined to a first end of said main shaft to be rotated therewith;
 a means for rotating said main shaft;
 hooks for gripping said workpiece;
 means for removably mounting said hooks on said thin membrane;
 said hooks forming a single assembly;
 means for operating said hooks including:
 nonrotating means for injecting air into said chuck body for bowing said thin membrane;
 bowed, said thin membrane opening said hooks;
 means for retaining said air;
 said retained air holding said thin membrane bowed;
 nonrotating means for releasing said air for flattening said thin membrane for closing said hooks; and
 safety means for releasing excess said air.

2. A chuck of claim 1, wherein:
 said chuck body is a compound cylinder having a first blind bore extending inwardly from a wide first end and a second blind bore extending inwardly from a narrow projection at a second end;
 said blind bores being axially aligned;
 said blind bores being separated by a perforated wall;
 a thin membrane sealing said first blind bore;
 a piston in said first blind bore;
 said first blind bore being closed by a perforated lid;
 said piston being elastically pressed against said perforated lid;
 said piston for release of excess air;
 a backflow valve in said second blind bore;
 a first end of a air tube slidably extending into said second blind bore;
 said first end of said air tube being open;
 a second end of said air tube having a perforated wall;
 said backflow valve elastically closing said first end of said air tube;
 a narrow air path parallel to said first and second blind bores;
 a second end of said air tube entering a narrow bore extending some distance from a first end of a cylinder;
 a second end of said cylinder having a wide bore extending to axially meet said narrow bore;
 a second end of said cylinder being sealed by an end plate;
 a free piston movable in two positions in said wide bore;
 said second end of said air tube elastically held so as to extend slightly into said wide bore;
 a first air inlet in said cylinder between said free piston and said air tube;
 said air inlet to inlet air to hold said free piston against said end plate;
 said air inlet to inlet air between said lid in said first blind bore and said thin membrane;
 said thin membrane expanded outwardly from said first blind bore;
 said piston in said first blind bore for holding said air against said thin membrane;
 said piston in said first blind bore for releasing excess said air;
 a second air inlet in said cylinder to inlet air between said free piston and said end plate;
 said free piston to bear against air tube; and
 air tube to urge backflow valve to open said air path to release said air from between said piston in said first blind bore and said thin membrane.

3. A chuck for holding a workpiece of claim 1, wherein: said hooks are supported by said thin membrane;
 said thin membrane having a plurality of gripping members;
 said gripping members arranged radially around on said thin membrane;
 said gripping members for supporting a removable hook attachment;
 said hook attachment including a plurality of hooks arranged radially and joined at a perimeter of said radial arrangement by a ring;

said ring supporting said radial arrangement of said hooks;

each said hook removably affixed to one of said gripping members;

there being one said gripping members for each said hook; and said hooks being movable with said gripping members.

4. A chuck for holding a workpiece comprising:

a compound cylinder having a first blind bore extending inwardly from a wide first end and a second blind bore extending inwardly from a narrow projection at a second end;

said blind bores being axially aligned;

said blind bores being separated by a perforated wall;

a perforated lid sealing said first blind bore;

a thin membrane covering said perforated lid;

a piston in said first blind bore;

said piston being elastically pressed against said perforated lid;

a backflow valve in said second blind bore;

a first end of a air tube slidably extending into said second blind bore;

said first end of said air tube being open;

a second end of said air tube having a perforated wall;

said backflow valve elastically closing said first end of said air tube;

a narrow air path parallel to said first and second blind bores;

a second end of said air tube entering a narrow bore extending some distance from a first end of a cylinder;

a second end of said cylinder having a wide bore extending to axially meet said narrow bore;

a second end of said cylinder being sealed by an end plate;

a free piston 20 movable in two positions in said wide bore;

said second end of said air tube elastically held so as to extend slightly into said wide bore;

a first air inlet in said cylinder between said free piston and air tube;

said air inlet to inlet air to hold said free piston against said end plate;

said air inlet to inlet air between said piston in said first blind bore and said thin membrane;

said thin membrane expanded outwardly from said first blind bore;

said piston in said first blind bore for holding air against said thin membrane;

said piston in said first blind bore for releasing excess air;

a second air inlet in said cylinder to inlet air between said free piston and said end plate;

said free piston to bear against said air tube; and said air tube to urge said backflow valve to open said air path to release said air from between said perforated lid on said first blind bore and said thin membrane.

5. A chuck for holding a workpiece, comprising
a thin membrane;

said thin membrane having a plurality of gripping members;

said gripping members arranged radially around on said thin membrane;

said gripping members including means for supporting a removable hook attachment;

said hook attachment including a plurality of hooks arranged radially and joined at the perimeter of said radial arrangement by a ring;

said ring supporting said radial arrangement of said hooks;

means for removably affixing each said hook to one of said gripping members;

there being one said gripping member for each said hook; and said hooks being movable with said gripping members.

6. A chuck comprising:

a plurality of hooks;

said plurality of hooks each including at least one surface for contacting a workpiece;

a membrane;

means for affixing said hooks to said membrane;

means for deforming said membrane, whereby said at least one surface on each of said hooks is moved in a radial direction;

means for retaining said plurality of hooks in a unitary, removable assembly;

said means for retaining includes a ring; and each of said plurality of hooks being affixed in predetermined angular relationships to said ring.

7. A chuck comprising:

a plurality of hooks;

said plurality of hooks each including at least one surface for contacting a workpiece;

a membrane;

means for affixing said hooks to said membrane;

means for deforming said membrane, whereby said at least one surface on each of said hooks is moved in a radial direction;

said means for deforming includes means for applying a deforming pressure to one surface of said membrane;

said means for applying a deforming pressure includes admitting a pressurized fluid to one surface of said membrane;

said means for admitting a pressurized fluid includes an air tube;

said air tube being axially aligned with said chuck;

said air tube being non-rotating;

means for sealing said air tube to a rotating portion of said chuck;

means for supplying air to said air tube, whereby said membrane is deformed;

a backflow valve in said chuck;

means in said backflow valve for preventing flow of air from said membrane to said air tube, whereby said membrane remains deformed without requiring a continuous supply of air; and means for releasing said backflow valve.

* * * * *